United States Patent

[11] 3,588,014

| [72] | Inventor | Clifton G. Reed<br>1322 Canterlane, Houston, Tex. 77047 |
|---|---|---|
| [21] | Appl. No. | 854,239 |
| [22] | Filed | Aug. 29, 1969 |
| [45] | Patented | June 28, 1971<br>Continuation of application Ser. No.<br>811,183, Mar. 27, 1969, now abandoned. |

[54] INSTRUMENT MOUNT
4 Claims, 3 Drawing Figs.

[52] U.S. Cl............................................. 248/180,
33/73, 33/221

[51] Int. Cl. ...................................................F16m 11/12,
G01c 5/02, G01c 9/14
[50] Field of Search........................................... 33/72, 73
(D), 73 (A), 220 (Cursory), 221; 248/180, 182

*Primary Examiner*—Robert B. Hull
*Attorney*—Pravel, Wilson and Matthews

ABSTRACT: A leveling and sighting instrument for use in the leveling of foundations or other leveling operations including an annular element having a rounded peripheral edge portion engaging a supporting rim of an annular head and supporting such head at an elevation above the ground with the rim disposed substantially in a horizontal plane.

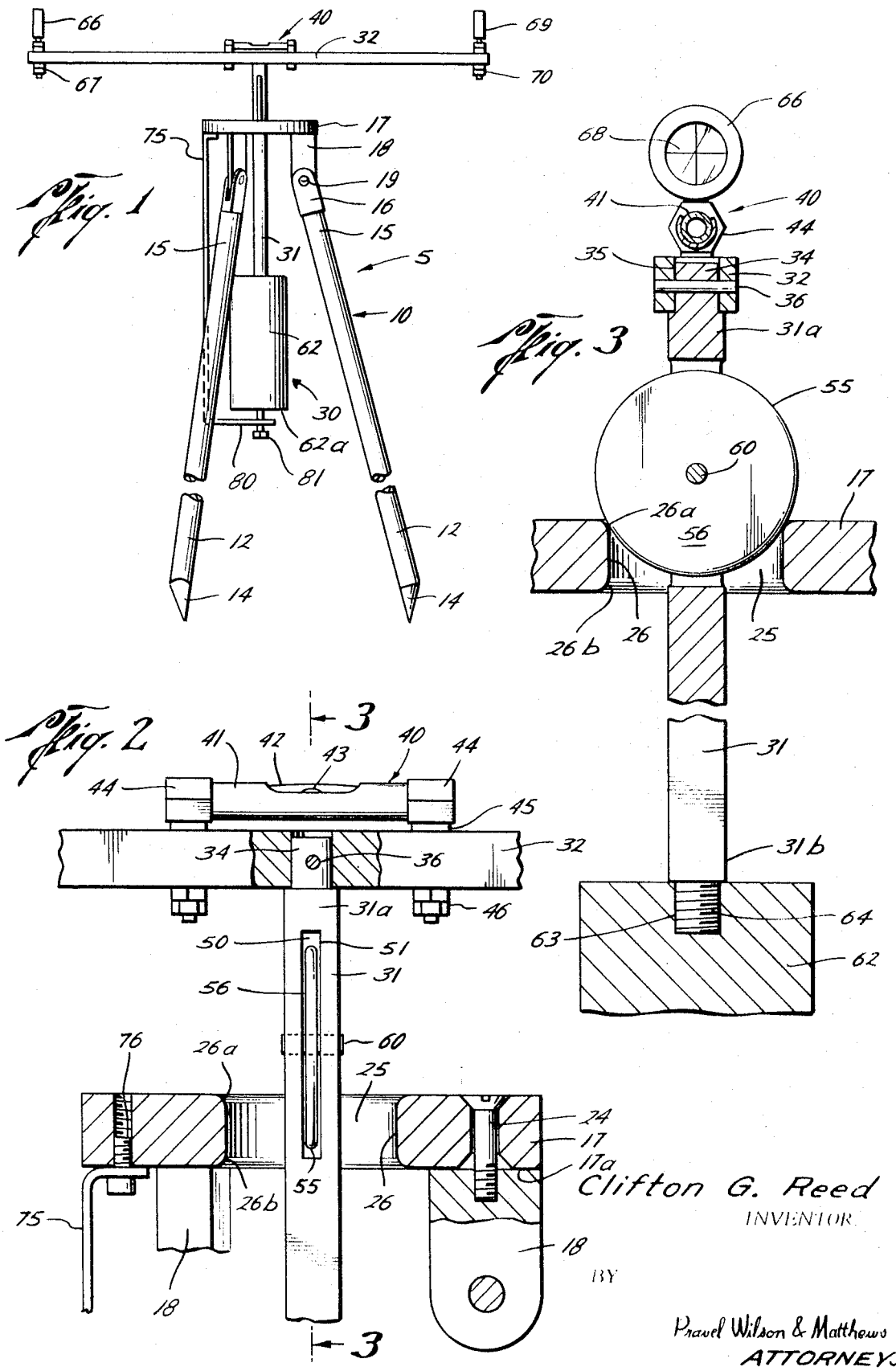

INSTRUMENT MOUNT

CROSS-REFERENCE TO RELATED APPLICATION

This application is a continuation of Ser. No. 811,183 filed Mar. 27, 1969 for "Levelling and Sighting Instrument" copending herewith and now abandoned.

BACKGROUND OF THE INVENTION

In preparing for construction, landscaping and other operations, it is normally necessary to use leveling and sighting instruments to determine the elevation of various points on proposed foundation sites, foundations or on real property relative to a fixed point to enable foundations or other desired structures to be erected in a horizontal, level or other calculated position. Heretofore, instruments for performing the leveling and sighting function, have been relatively expensive, easily damaged and costly to repair.

In the construction of residential dwellings, landscaping operations or land leveling not requiring extreme accuracy, a leveling and sighting apparatus utilizing a sighting bar and spirit level was often used. Such apparatus was usually supported on a tripod and included means for adjusting the sighting bar and spirit level until the desired level had been obtained irrespective of the slope or contour of the proposed foundation or land at the location site.

The sighting bar and spirit level apparatus of the prior art was often supported at an upper end of a vertically positioned arm or rod having a universal connection with a tripod. The vertical rod was usually mounted with a weight forming a pendulum at its lower end for maintaining the vertical rod in such vertical position for supporting the sight bar and leveling apparatus in a horizontal position. The use of such apparatus had several disadvantages. For example, the universal connection between the vertically positioned rod on the tripod was very sensitive and was often damaged by handling, loading or other usage. Further, to insure that the sighting bar and spirit level were positioned horizontally, it was necessary to take great pains to adjust the tripod and universal connection relative to each other. Such adjustments were usually time consuming and very difficult to achieve if swinging movements were imparted to the pendulum by wind and the like.

SUMMARY OF THE INVENTION

Briefly, the present invention relates to a leveling instrument and more particularly, a new and improved leveling instrument.

The present invention also relates to a leveling instrument having an annular head and a supporting rim, means for supporting the head, an instrument mount supported on the head for rocking movement thereon, the mount comprising an upright rod, a support means mounted with the rod for pivotally resting on said rim, a sight bar mounted and carried by said rod, weight means mounted by said rod below said support rim and positioned to exert a force on said rod when said means causes said rod to assume a vertical position for enabling leveling operations to begin as desired.

It is an object of the present invention to provide a new and improved leveling instrument which is easy to assemble and which is easy to load and carry and yet is not subject to damage due to handling.

BRIEF DESCRIPTION OF THE DRAWINGS

FIG. 1 is a side elevational view of the sighting and leveling instrument of the present invention;

FIG. 2 is a partial sectional view illustrating the relationship of a supporting head and an instrument mount of the present invention; and FIG. 3 is a partial sectional view taken on line 3-3 of FIG. 2, illustrating the relationship of the supporting head and the instrument mount of the present invention.

DESCRIPTION OF THE PREFERRED EMBODIMENT

As illustrated in FIG. 1, the leveling and sighting instrument of the present invention is generally designated by the numeral 5, and is supported by a tripod generally designated at 10 having at least three legs 12. The lower end 14 of each of the legs is pointed for engagement with the ground as is well known in the art. On the upper end 15 of each of the legs is mounted a metal support bracket 16. A base member or supporting head 17 is provided with downwardly depending bracket 18 which are mounted by pivot pins 19 on support bracket 16 mounted on the legs 12 for enabling the legs 12 to pivot relative to the bracket 18. As illustrated in FIGS. 1 and 2, the bracket 18 depend from the lower surface 17a of the support head 17. It is to be understood, and as is well known in the art, the legs 12 may be swung inwardly and outwardly relative to each other at their lower ends 14 to support the head 17 in an elevation above the ground or site as desired.

It should also be apparent that the bracket or lug 18 may be secured on the lower surface 17a of the support heads 17 in any manner such as welding or screws and, as illustrated in FIG. 2, support bracket 18 are secured on the support heads 17 by screws 24.

The support head 17 may be shaped in the form of a ring or may have other forms, as desired. As illustrated in FIGS. 2 and 3 an opening 25 in such support head 17 is milled, ground or cut in the support head 17 such that a rim 26 adjacent the opening 25 includes angled supporting faces 26a and 26b.

The instrument mount of the present invention is generally designated by the numeral 30 and includes a rod, support shaft or connection member 31 having an upper end 31a and a lower end 31b. A sighting bar 32 is mounted on and secured to the upper end 31a of the rod 31 transversely to such rod 31 at substantially the center of the sighting bar 32, as illustrated in FIG. 1.

As illustrated in FIGS. 2 and 3, the upper end 31a of the rod 30 includes a recessed head portion 34 which extends upwardly into an opening 35 in the sight bar 32. A connection pin 36 extends through an opening (not numbered) in the sight bar 32 and rod 31 for connecting the rod 31 and sight bar 32 relative to each other.

A spirit level generally designated as 40 (FIGS. 2 and 3) includes an oil filled cylinder 41 and window 42 as is well known in the art for viewing a bubble 43 which generally indicates the position of the spirit level 40 relative to the horizontal. The spirit level 40 has mounted at each end thereof hold members 44, each having a shaft 45 extending downwardly through such bar 32. Nut means 46 are threadedly engaged with the shaft 45 to secure the spirit level 40 in a longitudinal substantially parallel position relative to the sight bar 32.

If desired, leather or rubber pads, or other resilient means (not shown) may be mounted around the shaft 45 between the hold members 44 and sight bar 32. The pads and the like permit minute adjustment of the sight bar 32 to maintain such bar level.

A longitudinally extending slot 50 having sidewalls 51, is formed in rod 31 for receiving a balancing or supporting means which is illustrated in FIGS. 2 and 3 as being in the shape of a circular disc 56 having rounded edges 55 (FIG. 2). The disc 56 is centrally positioned relative to the slot 50 by a pin 60 which extends through the disc and bar 31 as illustrated in FIG. 2. This enables the rounded edge 55 of the disc 56 to engage and rest upon the edge 26a of the rim 26 and it should be apparent that by rotation of the disc 56 other sections of the rounded edge 55 may be positioned for engagement with such rim portion 26a.

As illustrated in FIGS. 1 and 2, a weight means 62 is threadedly engaged with the lower end 31b of the rod 31 with the use of the threads 63 extending outwardly and into a threaded opening 64 in such weight means 62. The weight means 62 extends downwardly through the opening 25 and enables the disc means 56 to pivot and rest on the rim portion 26a but at the same time maintains the disc 56 in a stationary position.

As illustrated in FIGS. 1 and 3, an upwardly extending ring 66 is mounted by nut and bolt means 67 to one end of the sighting rod 32. The ring 66 includes a perforated disc 68 which forms a peep hole for sighting, and as illustrated in FIG. 1, a similar disc 69 is mounted by nut and bolt means 70 to the other end of the sighting bar 32 and includes a crosshair or the like as is well known in the art for enabling the peep sight and crosshair to be aligned relative to each other.

In some instances the instrument mount 30 of the present invention may swing or rock relative to the rim portion 26a. This is undesirable and to prevent such swinging movement a downwardly extending bracket arm 75 is mounted by suitable bolt means 76 to the lower surface 17a of the supporting head 17, as illustrated in FIG. 2. The downwardly extending bracket 75 includes an arm or bracket member 80 extending horizontally inwardly, transverse to such bracket member 75 which bracket member 80 is positioned under the weight means 62. An adjustable screw means 81 is mounted with such inwardly extending bracket arm 80 and is adapted to be screwed upwardly so that the end of the screw means 81 contacts the weight means 62 to prevent movement of such weight means when the sighting bar 32 has been brought to a level position.

In the operation of the invention, the tripod generally designated at 5, is set at any desired location with the instrument mount 30 positioned relative to the supporting head 17 so that the disc 56 is resting on the rim portion 26a of the rim 26. The weight means 62, since it extends directly vertically beneath the disc 56 and rod 31, will cause the sighting rod 32 to assume a horizontal position and if adjustments are necessary, the disc 56 may be positioned or rocked or moved on the rim portion 26a until the sighting rod 32 has been positioned relative to the horizontal.

When a level position has been obtained, screw means 81 may be rotated upwardly to engage the lower end 62a of the weight means 62 to hold and maintain the sighting bar 32 in a level position.

It is to be understood that while a sight bar 32 has been described as the object to be leveled or acted upon by the instrument mount 30 of the present invention, that other instruments such as telescopes, or other apparatus, may be positioned with and operated by such mount 30.

Also, it is to be understood that if the head 17 and the rim 26a become worn, such head may be rotated or turned over to enable the underface and rim 26b to be used as the upper surface.

The foregoing disclosure and description of the invention are illustrative and explanatory thereof, and various changes in the size, shape, and materials as well as in the details of the illustrated construction may be made without departing from the spirit of the invention.

I claim:
1. In a leveling instrument comprising:
    a. an annular head having a supporting rim;
    b. means for supporting the head at an elevation above the ground with said rim disposed substantially in a horizontal plane;
    c. an instrument mount removably supported on the head for rocking movement thereon, said mount comprising:
        1. an upright rod;
        2. support means mounted on said rod positioned for pivotally resting on said rim and for supporting the rod for swinging movement and for axial rotation of said rod and support means relative to the head, said support means including an annular element mounted pivotally about its central axis on said rod with said axis transverse to the longitudinal axis of said rod, said element having a rounded peripheral edge portion positioned for engagement with said rim to support the rod on said head;
        3. means carried by the rod above said support rim for movement to a horizontal position upon movement of said rod to a vertical position and for measuring as desired; and
        4. weight means mounted on said rod below said support means and positioned to exert a force on said rod wherein said weight means causes said rod to assume a vertical position.
2. The leveling instrument as set forth in claim 1 including:
    a. means movably carried by said head and positioned for movement relative to said weight means for preventing said weight means from swinging or moving relative to said head.
3. The leveling instrument as set forth in claim 2 wherein said movable means includes:
    a. bracket arm means mounted with and extending downwardly from said head; and
    b. adjustable screw means mounted with bracket arm for preventing movement of said weight means relative to said head.
4. The leveling instrument as claimed in claim 1 wherein sad annular element is rotatably carried on said rod.